Patented May 5, 1925.

1,536,919

UNITED STATES PATENT OFFICE.

JOSEPH CARL PARKINSON, OF TARENTUM, PENNSYLVANIA, ASSIGNOR TO PITTSBURGH PLATE GLASS COMPANY, A CORPORATION OF PENNSYLVANIA.

ABSORPTION GLASS AND METHOD OF MAKING IT.

No Drawing. Application filed November 15, 1922. Serial No. 601,144.

*To all whom it may concern:*

Be it known that I, JOSEPH CARL PARKINSON, a citizen of the United States, and a resident of Tarentum, in the county of Allegheny and State of Pennsylvania, have made a new and useful invention in Improvements in Absorption Glass and Methods of Making It, of which the following is a specification.

The invention relates to glass for absorbing the ultra violet rays of light and has for its principal object the production of an improved glass of this type which requires a relatively small amount of expensive chemicals and which is clear and colorless as opposed to the tinted glasses which have heretofore been produced having the property of high ultra violet ray absorption. Glass of this character is desirable for use in windshields and other forms where a tinted glass is objectionable and also in some cases in spectacle glass.

One of the compounds most commonly used heretofore in producing the tinted absorption glass is cerium oxid ($CeO_2$) which has been introduced into the batch in the form of a nitrate, carbonate or hydrate or other salt. In any of its commercial forms this compound always gives a tinted glass having a pink tinge when the glass is viewed edgewise in connection with artificial light. This color characteristic is apparently due to the presence with the cerium oxid of small percentages of other oxids, particularly didymium and is also due to the agency employed in fining the glass. I have found that when technically pure cerium oxid, salt or other compound containing cerium practically free from didymium is employed in a reducing batch the desired result is achieved, namely, a clear, colorless glass having the required absorption properties. By "reducing batch" is meant one of the type employing reducing compounds such as coal, charcoal, arsenic, etc., commonly used for that purpose. This type of batch is distinct from what may be termed an oxidizing batch, in which compounds such as nitrates are used for maintaining an oxidizing condition during melting.

The following batch formula is typical of what may be used to produce a satisfactory glass:

| | Pounds. |
|---|---|
| Sand | 1,000 |
| Soda ash | 423 |
| Whiting | 100 |
| Cerium hydrate | 43½ |
| Salt | 25 |
| Arsenic or antimony | 5 |
| Salt cake | 50 |
| Coal | 3 |

The cerium hydrate which is employed is technically pure and the percentage of didymium oxid in this compound is so small that it has no color effect, which is quite a different situation as compared with the ordinary commercial cerium compound which may contain as much as 20% of didymium oxid.

The amount of cerium hydrate which may be employed may be very largely increased over that specified above without giving any color to the glass produced, but at the same time no perceptible improvement in the absorption properties is involved and the expense is increased as the hydrate is one of the most expensive ingredients in the batch. In place of the cerium hydrate other cerium compounds may be employed, provided they contain a relatively low percentage of didymium and provided adjustment is made to secure the proper amount of cerium oxid corresponding to that contained by the hydrate.

If, in place of the batch employed, one is used employing a nitrate in place of the salt cake, so that the fining reaction occurs from the nitrate in connection with arsenic or similar material, a tinted glass results even though a technically pure cerium compound is employed.

The glass produced by the improved process is clear and colorless and has high ultra violet ray absorption qualities.

What I claim is:

1. A substantially clear, colorless glass with high ultra violet ray absorbing properties containing cerium oxid and substantially free from didymium oxid and formed by fusing a substantially pure cerium compound in a reducing batch.

2. The method of producing glass of high ultra violet ray absorbing properties which consists in fusing a substantially pure cerium compound in a reducing batch.

3. The method of producing glass of high ultra violet ray absorbing properties which consists in fusing a substantially pure cerium compound in a reducing batch including salt cake as a finding agent.

In testimony whereof, I have hereunto subscribed my name this 31st day of October, 1922.

J. CARL PARKINSON.